United States Patent [19]
Quinn

[11] 3,902,072
[45] Aug. 26, 1975

[54] WIND TURBINE

[76] Inventor: Paul J. Quinn, 633 S.W. 5th St., Boca Raton, Fla. 33432

[22] Filed: Feb. 19, 1974

[21] Appl. No.: 443,276

[52] U.S. Cl. .................. 290/44; 290/55; 416/111
[51] Int. Cl.² ........................................ F03D 9/00
[58] Field of Search ............ 290/43, 44, 54, 55, 1; 416/111, 121; 417/2, 3, 4

[56] References Cited
UNITED STATES PATENTS

| | | | |
|---|---|---|---|
| 1,568,000 | 12/1925 | Schmidt | 416/111 |
| 1,577,096 | 3/1926 | Aust | 416/111 |
| 1,744,924 | 1/1930 | Sargent | 416/111 |
| 1,964,347 | 6/1934 | Ford | 416/111 |
| 2,603,300 | 7/1952 | King | 416/111 |
| 3,241,618 | 3/1966 | Baer | 416/111 |

*Primary Examiner*—G. R. Simmons
*Attorney, Agent, or Firm*—Leo C. Krazinski

[57] ABSTRACT

A wind power generator having a horizontally rotatable platform with a plurality of vertical blades mounted around its periphery, all of the blades rotating coaxially around a central axis and each rotating on its own axis. The vertical blade rotation is responsive to changes in wind direction, as well as to changes in wind velocity and the rotation of each blade is controlled in such manner that through about three quarters of the platform rotation power is absorbed from the wind, while during the remaining period in which the blades are traveling against the wind, the blades will be substantially in phase with the wind for minimum resistance.

10 Claims, 6 Drawing Figures

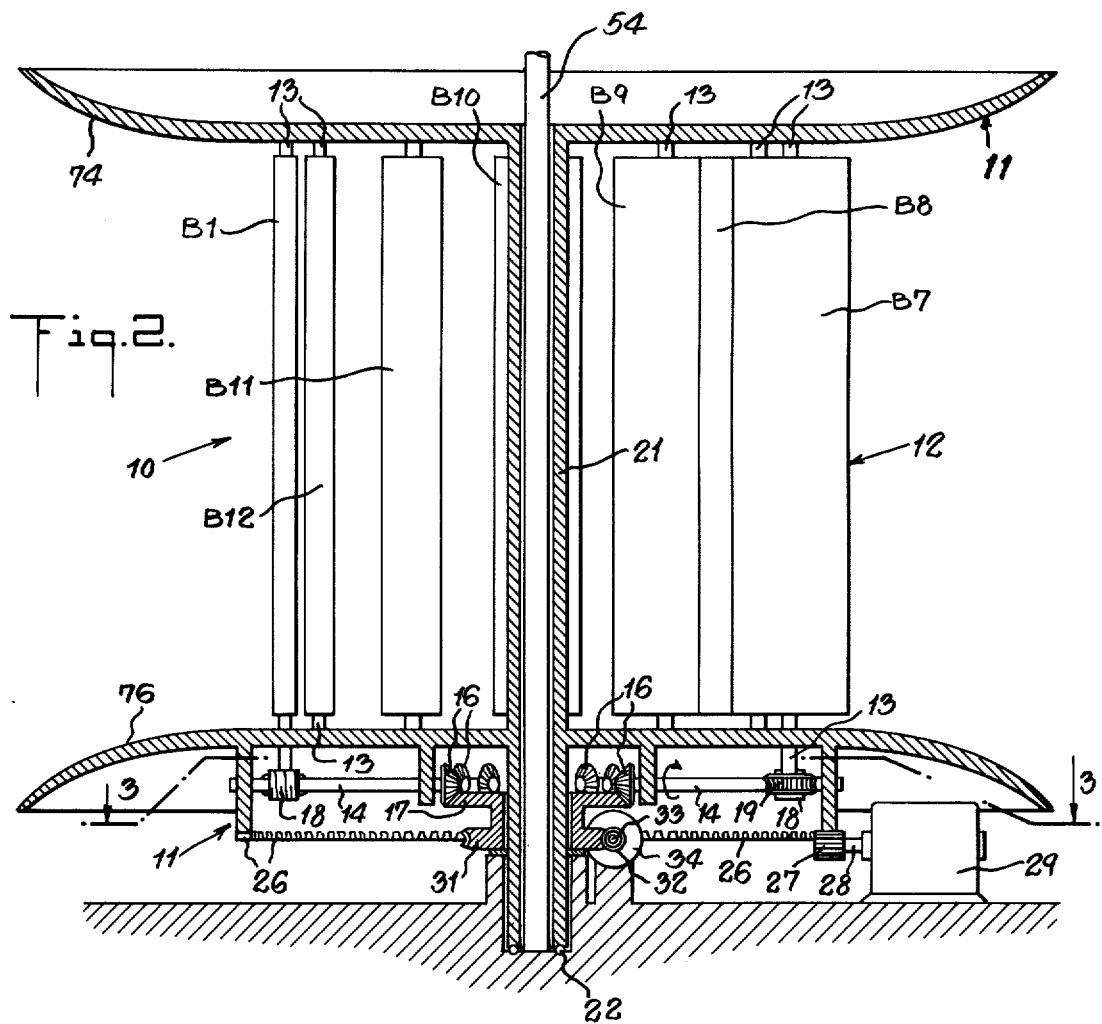
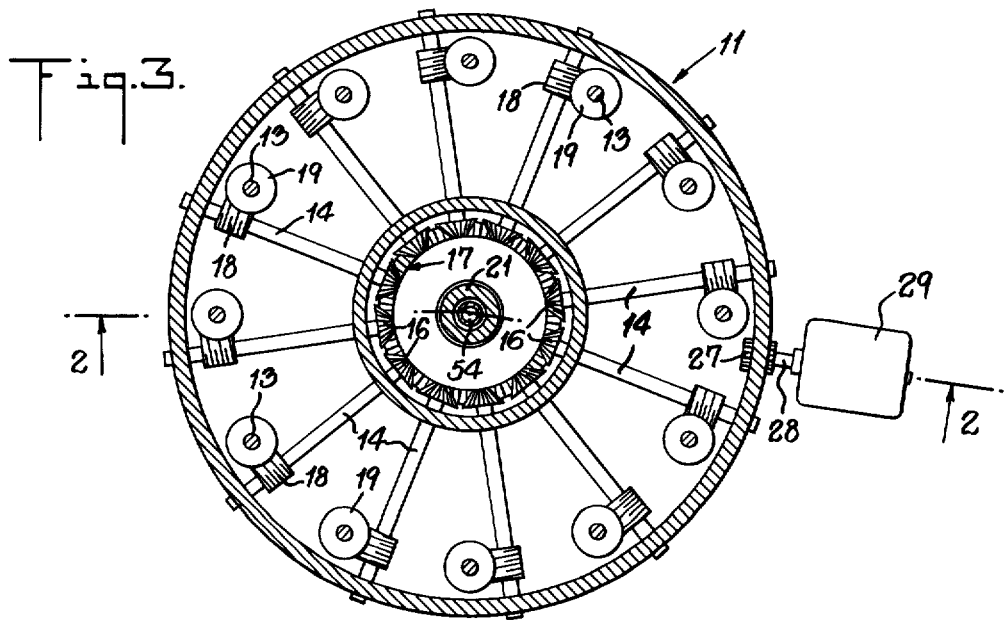

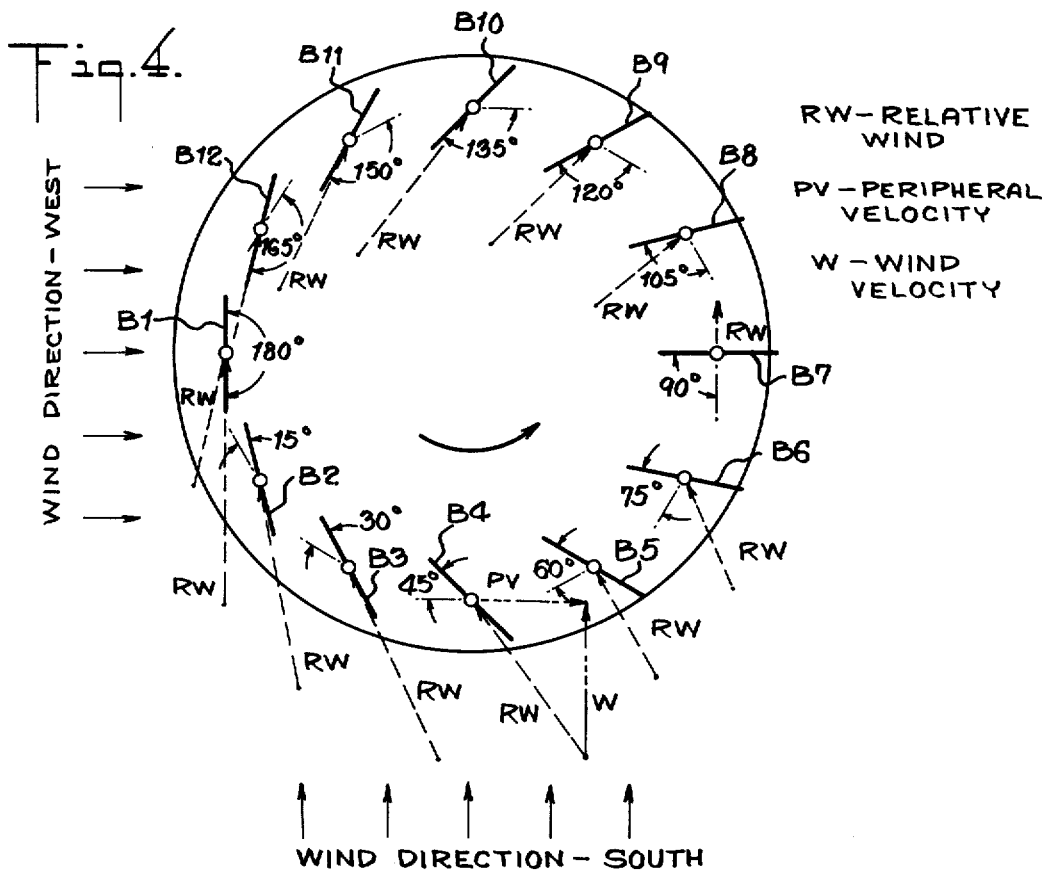
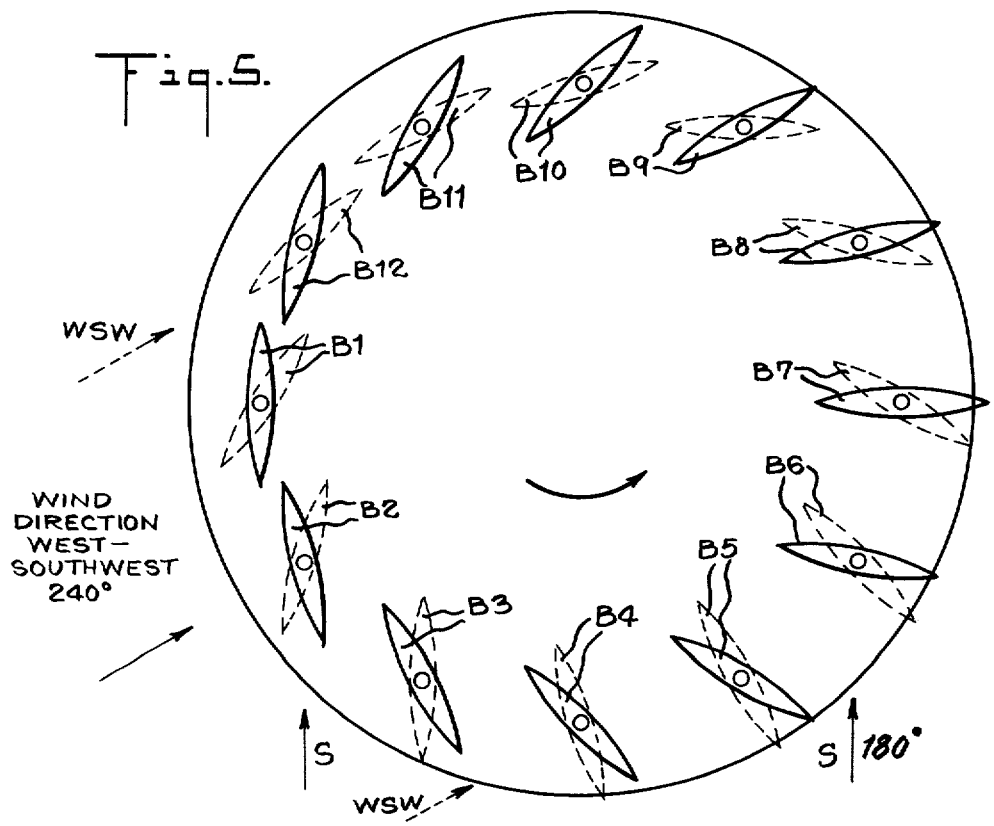

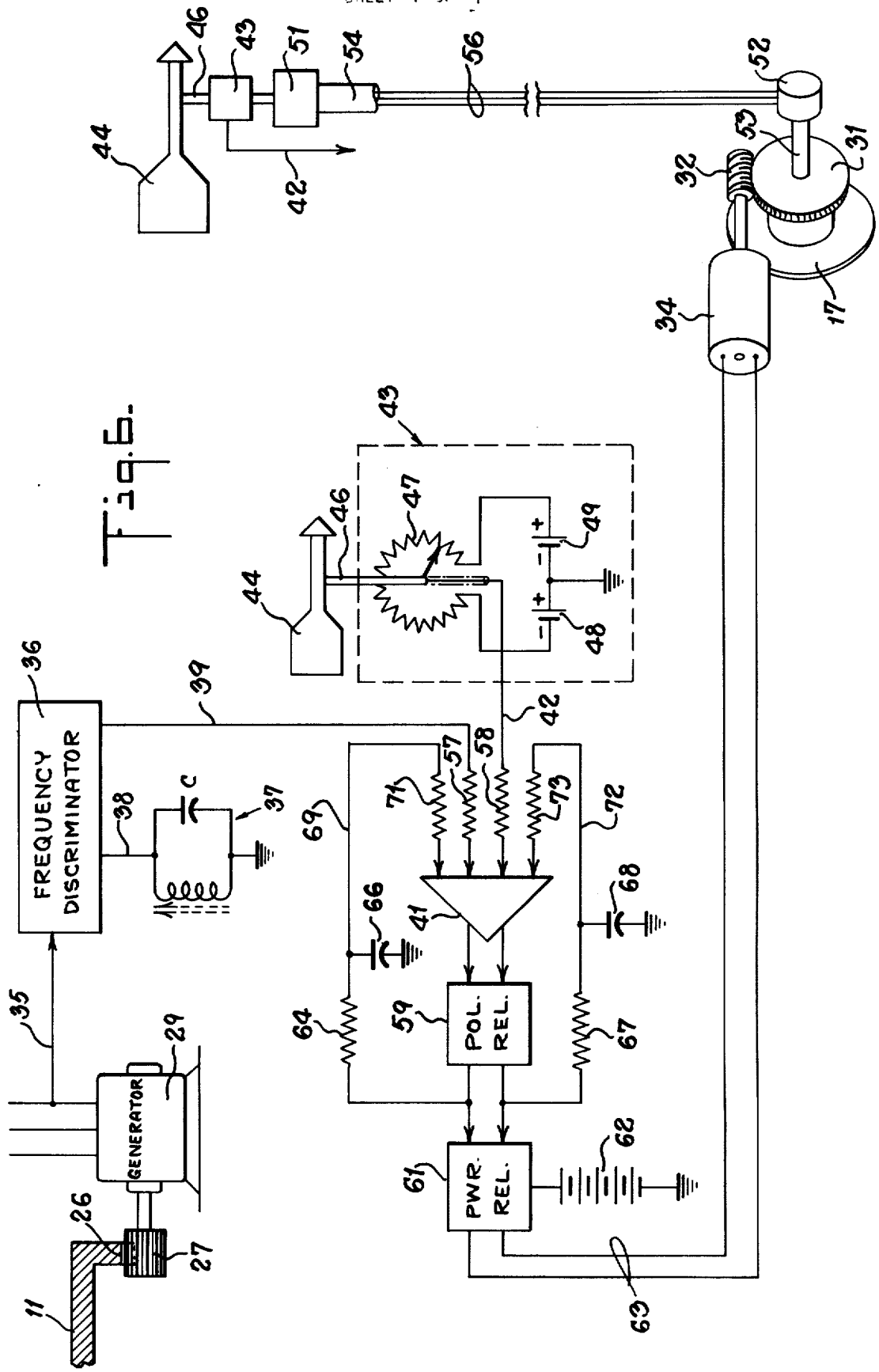

WIND TURBINE

BACKGROUND OF THE INVENTION

1. Field of the Invention

This invention relates to a wind powered generator of the vertical axis type especially designed for very large installations either isolated or connected to an electric power distribution system. Electric generators driven by propelled type windmills have been used for many year but, because of prohibitive cost, such designs are not practical in large sizes where great weight must be supported high in the air and moved around to face the wind. This invention concentrates a much geater percentage of the weight on or close to the ground and embodies a simple responsive mechanism to control speed and orient the device in the direction of the wind. This is accomplished by mounting a multiplicity of vertical blades within a cage or on a turntable platform. Each blade rotates on its axis one half revolution for one revolution of the platform. The gear trains used to turn the blades, as well as the electric generator and control devices, are all located under the revolving platform where their weight does not present a problem.

Description of Prior Art 12 Heretofore, the general type of vertical axis wind turbine has been investigated, see "The Generation of Electricity by Wind power" by E.W. Golding, 1955, London, Page 197, FIG. 70b, but not perfected. It is to be noted that Golding does not explain how to make the device face the wind or control its speed. A large wind turbine is also disclosed in Putnam, U.S. Pat. Nos. 2,360,791 and 2,360,792, both issued on Oct. 17, 1944. Because of its conventional design large weights must be supported high in the air. In the Voith-Schneider Propeller, Marine Engineers' Handbook, PP. 1428–1431, published by McGraw Hill book Company, Inc., N.Y., 1945 Edition, the blades are oscillated but are not rotated. In the November 1946 *Popular Science*, P. 144, the blades oscillate 20° either side of their circular path, and not completely as in the instant invention. a Wind Impeller and Electric Generator is also disclosed in Hings, U.S. Pat. No. 2,542,522 of Feb. 20, 1951. Here, the blades rotate but with all shafts horizontal.

The foregoing arrangements have a number of diadvantages, which are overcome by providing a ring gear and associated low inertia drive to control both speed and heading of the windmill.

SUMMARY OF THE INVENTION

Accordingly, an object of the present invention is to provide a wind turbine which is not subject to the foregoing difficulties and disadvantages.

Another object is to provide such a wind turbine which is simple, reliable and comparatively inexpensive.

A further object is to provide such a wind turbine which places vertical blades around the periphery of a horizontally rotating mechanism so as to obtain maximum torque for the entire blade.

A still further object is to provide such a wind turbine in which the cage assembly is enclosed within an upper and lower wind ducting unit, thereby increasing and stabilizing the wind flow through the blades.

Other and further objects will be obvious upon an understanding of the illustrative embodiment about to be described, or will be indicated in the appended claims, and various advantages not referred to herein will occur to one skilled in the art upon employment of the invention in practice.

Brief Description of the Drawings

A preferred embodiment of the invention has been chosen for purposes of illustration and description and is shown in the accompanying drawings, forming a part of the specification, wherein:

FIG. 2 is a front elevational view of the wind turbine, sectionalized as along line 2—2 of FIG. 3, to show the essential gearing, the cage structure and coupling to the power generator.

FIG. 3 is a sectional view taken along line 3—3 of FIG. 2.

FIG. 4 shows schematically, in plan view, the blade motion as the cage rotates. Wind and blade vectors for a peripheral speed of the turbine equal to 0.75 of the wind velocity are also shown.

FIG. 5 is a schematic view, similar to that of FIG. 4, in which the blades are shown with a wind shift from the south around toward the west 60°.

FIG. 6 is a schematic-block diagram of an electronic control system designed for independent operation of the wind turbine.

DESCRIPTION OF THE PREFERRED EMBODIMENT

Figure 1:
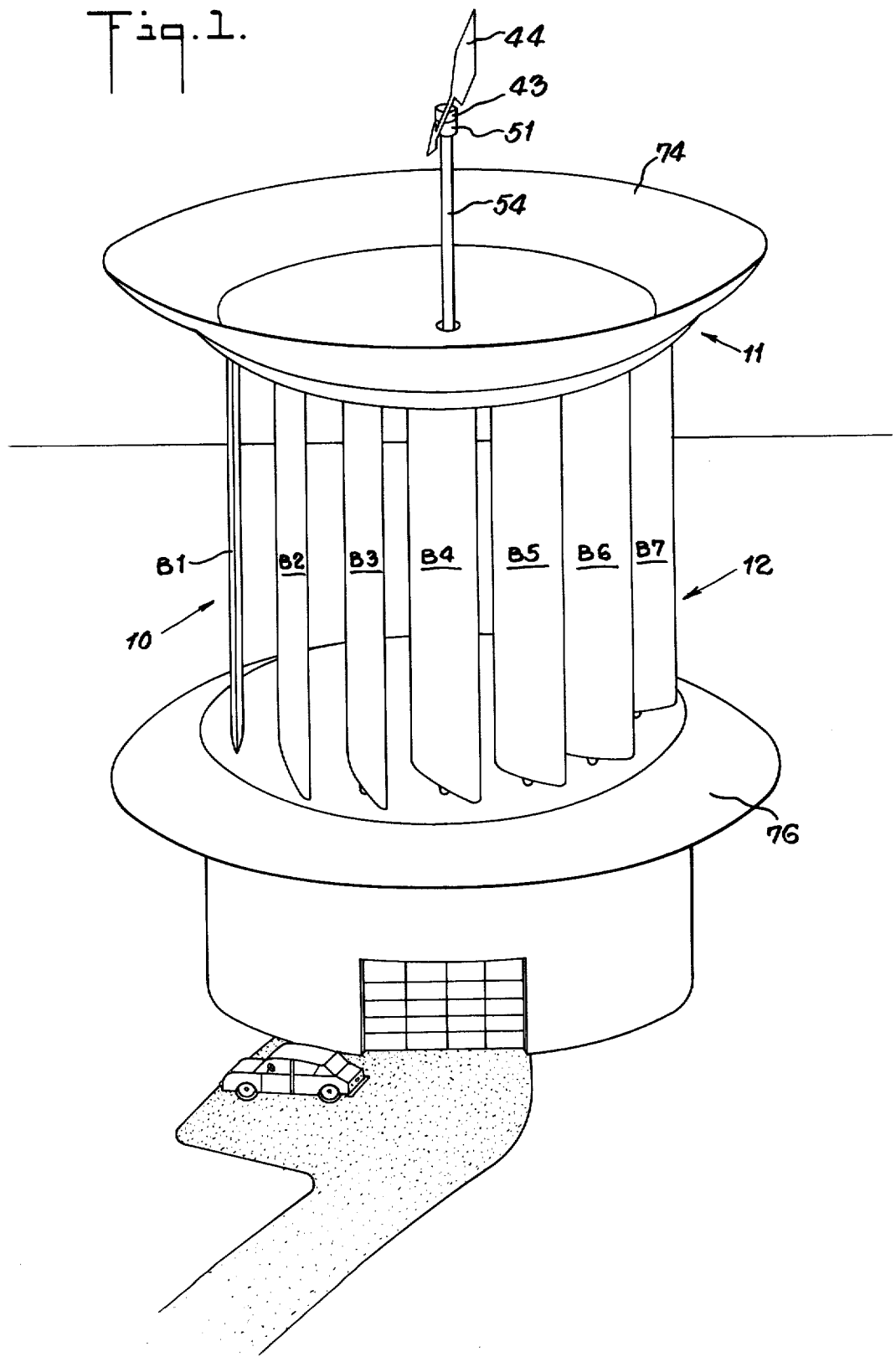
FIG. 1 is a perspective view of a wind turbine in accordance with the invention, the disposition of the blades being in response to direction of the wind as indicated by the weather vane of the the top ofthe figure.

Referring now to FIGS. 1, 2, 3 and 4 of the drawings in detail, there is shown a wind turbine 10 having a rotating platform or cage 11 that carries around its periphery vertically mounted blades 12, numbered B1, B2, B3, B4, B5, B6, B7, B8, B9, B10, B11, B12. Any number of blades may be used, but twelve blades appear to result in an optimal configuration. In order to absorb power from the wind the blades 12 must rotate on their own axes one-half revolution for each revolution of the cage 11. Referring to FIG. 4 and assuming the wind to be blowing from the south, as shown by the arrows, the blade B4, which is at a 45° angle, will be forced to the right, as viewed in FIG. 4. Blade B7, at 90° to the wind, will be pushed straight ahead, towards the top of the drawing, while blade B10, at 135°, will move to the left. This movement will produce counterclockwise rotation of the cage 11. The intermediate blades will be more or less similarly activated. Blades B12, B1 and B2 will be moving against the wind but at such an angle as to minimize drag.

The motion of each blade 12 about its own vertical axis or spindle 13 is obtained from its own horizontal shaft 14, which is journaled to the cage 11 and driven by means of a cone gear 16 at its inner end in mesh with a central ring gear 17 and at its outer end turning a worm gear 18 in mesh with a worm wheel 19 rigidly secured to the spindle 13 of the blade 12. Thus it is seen that each worm wheel drives its associated spindle to produce the required blade motion. The gear ratios employed might be, but are not, limited to the following: ring gear 17 with two hundred teeth, cone gears 16 with 25 teeth, and worm gear 18 to worm wheel 19 ratio 16:1. With this arrangement the drive shaft 14 speed is eight times the cage 11 rotational speed and the resultant blade 12 rotation is one-half the cage 11 speed. Different types of gear trains, without the worm gear-worm wheel combination, or for that matter, chain drives, or cams or even separate servo motors on each blade might be used, as deemed appropriate to meet engineering requirements and still be within the intent of this invention.

Since the wind does not always blow from the same direction, it is necessary in the classic windmill design to rotate the main housing, so that the wind will blow directly into the impeller (or directly to the rear in some special designs). This imposes serious mechanical and control problems, especially where large structures are involved. They cannot be made to "weather-vane" into the wind as easily as the familiar farm windmill. Therefore, as a major feature of the wind turbine of this invention, only the ring gear 17 need be turned to adjust the blades in response to a change in wind direction.

For example, in FIG. 4, if the wind changes direction from the south 90° clockwise to the west, it is only necessary to rotate the ring gear 17 a like 90° to correct for this change in wind direction. However, if the ring gear 17 were to remain fixed in its original position with a wind shift of 90°, the wind turbine would stop. Thus with the ring gear fixed and the wind changing direction between these two points, essentially but not necessarily 90° apart, the speed of the cage 11 will vary from zero to a maximum R.P.M. determined by the wind velocity. It will be seen later how this characteristic is employed to control speed.

In actual operation, the ring gear 17 will be repositioned in response to a change in wind direction. FIG. 5 shows the arrangement with the wind shifted from the south around toward the west 60°. With the wind from the 240° direction and with proper ring gear 17 rotation to compensate for the wind shift, the blades 12 will be operated at the dotted line positions, as compared to the solid line blades 12 for a southerly 180° wind. Now, for example, if the drawing containing FIG. 5 is turned couterclockwise 60°, it will be observed that the blades 12 are again in their original positions with respect to the wind. That is the prime function of the ring gear 17, namely, to cause the blades 12 to always present the B4 "station" to the wind, with all other blades 12 relatively positioned as shown in FIG. 4.

As seen particularly in FIG. 2, the ring gear 17 is journaled around a vertical sleeve 21 of the cage 11, which sleeve 21 is rotatable and carried upon a thrust bearing 22. Within the sleeve 21 is shown a vertical, elongated stationary tube 23 for a purpose that will be explained hereinafter. Output power is obtained from rotation of the cage either by coupling to the vertical sleeve 21 at the lower end of the cage 11 or, as shown in FIG. 2, by a ring gear 26 carried at the lower end of the cage 11, the teeth of which are in mesh with teeth on a gear 27 mounted on a shaft 28 of an electric generator 29.

In its simplest form without speed control, pumping water for example, the ring gear 17 is provided with an integral, stub gear 31 having teeth that mesh with teeth of a worm gear 32 mounted upon a shaft 33 of a servo motor 34, which drives the ring gear 17. The servo motor 34 is preferably a reversible two field D.C. motor controlled by relays operating as directed by a wind detecting vane, as will appear hereinafter in connection with the control system shown in Fig. 6. A two phase servo motor system might be employed with suitable changes in the circuit of FIG. 6, but such refinements would not improve the control characteristics of the system appreciably.

For electric generation, either A.C. or D.C. working as an independent system, fairly precise control of speed is generally desirable. The block diagram of FIG. 6 shows a preferred arrangement, although by no means the only method that might be employed to actuate the ring gear 17. Referring to FIG. 6 and assuming that A.C. power is required, such a generator 29 is coupled to the cage 11 by means of gears 27 and 26. A very small portion of the generator output is fed via lead 35 to a frequency discriminator 36 tuned to the required frequency by an L C circuit 37 via lead 38. The output from the discriminator 36 is a direct current voltage polarized either plus or minus depending on whether the generator frequency is high or low. This signal is fed by a lead 39 to a summing amplifier 41.

At the same time a similar polarized signal 42 is fed into the summing amplifier 41 from a wind direction sensing unit 43, which is connected to a wind vane 44 by a shaft 46. This signal is obtained from a 335° potentiometer 47 energized by a plus and minus voltage source 48 and 49, respectively. The potentiometer 47 is turned by the wind vane 44 and the circuit operates to maintain zero signal, or midpoint on the potentiometer 47, when the wind turbine 10 is facing the wind. Position feedback is accomplished by the use of a pair of selsyn repeaters, follower 51 and transmitter 52, where the transmitter 52 is directly driven by the stub ring gear 31 through a shaft 53; and the follower 51, mounted at the top of a vertical, hollow shaft 54, supports the wind direction sensing unit 43 and vane 44. Thus the signal sent by the wind direction indicator 43 is actually the deviation of the wind from the position of the ring gear 17, which is integral with stub gear 31. The selsyn support shaft 54 runs down through the rotating cage 11 to the base of the structure, as seen in FIG. 2, and does not rotate. It is hollow and carries the wires 42 and 56 for signal transmission.

Continuing with reference to FIG. 6, the two error signals, speed 39 and direction 42, are fed to the summing amplifier 41 through weighting resistors 57 and 58, respectively, which adjust the relative strength of each signal as required. At no error or deviation from either set speed or wind direction, there is zero output from the amplifier. When an error develops, the amplifier output is either plus or minus in polarity and operates a polarized relay 59. This sensitive relay in turn operates a power relay 61 which connects a power source 62 to one winding of the servo motor 34 via leads 63 causing it to drive the stub gear 31 and, in turn, the ring gear 17 in a direction to correct the error condition. This assumes that the wind velocity is sufficient to drive the wind turbine faster than the desired speed. In which case the resultant position of the ring gear 17 will be between the south or maximum speed direction (FIG. 4) and the west or zero speed position. If the wind speed is not sufficient to maintain the desired R.P.M., a supplementary circuit (not shown) to switch to "direction only" control will be required to eliminate false operation of the speed signal 39.

Because it is essential that these controls operate in a stable non-hunting manner, I here apply the proven techniques covered in my U.S. Pat. No. 2,541,666 as follows: each time the polar relay 59 closes, the same voltage that energizes the coils of the power relay 61 is impressed on one of a pair of time constant networks 64 and 66 or 67 and 68. These produce a signal opposite to the initial error but delayed which, applied to the summing amplifier 41 via lead 69 and resistor 71 for the pair 64, 66 or via lead 72 and resistor 73 for the pair 67, 68, stops correction before overshoot or hunting can occur. Control of speed or frequency to ± 0.5% should be readily obtainable for controlling the wind turbine herein described. U.S. Pat. No. 2,541,666 shows the use of vacuum tubes in the electronic circuitry. It is understood that current more modern devices such as transistors and integrated circuits can now be employed.

While the above described control system is essentially electrical and electronic in nature, the same results can be achieved in a mechanical way in much the same way the aforementioned U.S. Pat. No. 2,541,666 was adapted in my U.S. Pat. No. 2,738,183. It follows that such means could as well be applied to control the ring gear 17 in a manner equivalent to that outlined above.

Operation of this wind turbine 10 is conjunction with an electric distribution system requires synchronization of the unit with the system line frequency. In addition, in order to provide useable output from the generator 29, the phase relationship between the line frequency and generator output must be properly and automatically controlled. This can be done by coupling the output of a wattmeter type device, measuring voltage and current, to the control circuitry of FIG. 6 in place of the discriminator 36. However, these special techniques, including start up and shut down proceedures, have been extensively covered in Putnam U.S. Pats. No. 2,360,791 and No. 2,360,792. Therefore, it is sufficient to conclude that where it is required to operate this vertical wind turbine 10 in conjunction with a commercial A.C. system, detecting and sensing means already known can be applied to initiate operation of the herein described control circuit shown in FIG. 6. And the characteristics of this system are capable of maintaining a satisfactory phase relationship between the generator and line.

It is thus apparent from the foregoing that the placement of vertical blades at the periphery of a rotating cage not only obtains maximum torque from the entire blade but enables one to use a simple type of blade as well. In conventional windmills the blades must twist as they get further from the hub in order to maintain constant angle of attack to the wind for maximum efficiency. Also more blades, hence greater power absorption for a specific structure, can be mounted on a vertical turbine of the instant invention. Large sized propeller type windmills are generally limited to two or four blades.

To increase and stabilize the wind flow through the blades there is shown in FIG. 1 simple dish-like caps 74 and 76 mounted at the top and bottom, respectively, of the cage 11. In some installations the lower wind director cap 76 might be simply the hill on which the turbine is installed. Where the unit is elevated above the surrounding terraine to avoid the natural turbulence in the wind caused by friction with the ground, similar or identical caps can be employed top and bottom. The advantages of this design will be retained even with an elevated installation because most of the weight will be supported on the base or fixed portion of the structure. This design is also more pleasing to the eye and should be acceptable in areas where, for ecological reasons, the conventional type might be found objectionable.

Where the winds are not reliable enough to produce sufficient power at all times, some storage means are required. This type of wind turbine is ideally suited to pumping water to an elevated storage tank or lake where it can be used as needed. Because the main shaft is vertical, the entire unit can be mounted out over water in a river or lake and a water turbine directly connected below the wind turbine to pump the water. This simplifies the installation because the wind turbine can be permitted to operate at maximum output at all times and only wind direction control will be needed.

A further advantage of this invention is use of the same mechanical control devices used to control speed and direction, to be responsive to manual or semi-manual control, and to stop rotation for repair, maintenance or in an emergency.

As various changes may be made in the form, construction and arrangement of the parts herein, without departing from the spirit and scope of the invention and without sacrificing any of its advantages, it is to be understood that all matters are to be interpreted as illustrative and not in any limiting sense.

What is claimed is:

1. A wind turbine comprising, in combination, a platform;; a plurality of vertical blades rotatably carried upon said platform; a vertical, central sleeve for carrying said platform; means for rotatably supporting said sleeve and, in turn, said platform, said blades being responsive to wind pressure for revolving said platform; gear means including a ring gear and a stub gear journaled around said sleeve; said stub gear being rigidly coupled to said ring gear, a transmission for coupling each of said blades to said gear means for providing a predetermined rotation of each blade with respect to rotation of said platform; means including a weather vane responsive to wind direction, a shaft connected at one end to said weather vane, electronic means connected at the other end of said shaft, said electronic means being responsive to movement of said weather vane, second gear means responsive to said electronic means, said second gear means being coupled to said ring gear for orienting said blades at optimal angles for power absorption from the wind; and means responsive to rotation of the platform for generating power.

2. A wind turbine in accordance with claim 1, wherein each of said blades includes a vertical spindle rigidly secured thereto and journaled adjacent its upper and lower ends in said platform; and wherein said transmission includes a shaft having at one end a gear rigidly secured thereto and in mesh with said ring gear and having at its other end a gear rigidly secured thereto, and a gear rigidly secured to the lower end of said spindle in mesh engagement with said last mentioned gear on said shaft.

3. A wind turbine in accordance with calim 2, wherein said gear ratio among said ring gear, shaft gears and spindle gear is such that the rotational speed of each of said blades is one-half the rotational speed of the platform.

4. A wind turbine in accordance with claim 3, wherein said gear means includes a ring gear having 200 teeth, said gear on one end of said shaft being a cone gear having 25 teeth, said gear at the other end of said shaft being a worm gear, and said spindle gear being a worm wheel with the ratio between said worm gear and worm wheel being 16:1.

5. a wind turbine in accordance with claim 1, wherein said power generating means includes a fluid pump and means for coupling said fluid pump to said rotating platform.

6. A wind turbine in accordance with claim 1, wherein said power generating means includes a ring gear rigidly secured to and rotatable with said platform, a gear in mesh with said platform ring gear, and an electric generator with a shaft having said gear rigidly secured thereto.

7. A wind turbine in accordance with claim 1, wherein said electronic means includes a servo motor responsive to said electronic means, and said second gear means includes a gear on said servo motor in mesh engagement with said stub gear.

8. A wind turbine in accordance with claim 1, wherein said electronic means includes a potentiometer responsive to said weather vane movement for transmitting electrical signals indicative of the deviation between the actual wind and a point on said first mentioned ring gear producing maximum power output, said shaft interconnecting said weather vane and said potentiometer, said electronic means being responsive to said electric signals, a reversible servo motor responsive to said first mentioned ring gear, whereby said servo motor is adapted to reposition and bring said point of said first mentioned ring gear into coincidence with direction of the wind, said electronic means also initiating a reverse delayed electrical signal for achieving correction without hunting.

9. A wind turbine in accordance with claim 8, wherein said power generating means includes an A.C. generator, an output frequency produced by said A.C. generator having said frequency directly proportional to rotational speed of said platform, a frequency discriminator for receiving a portion of said output and for producing therefrom a polarized output, said output being indicative of a deviation from a desired value of said generator frequency, a summing amplifier for receiving said polarized output and said electrical signals from said potentiometer and for producing an output signal, a polarized relay responsive to said amplifier signal, a power relay responsive to output of said polarized relay, and said servo motor being responsive to output of said power relay, whereby said first mentioned ring gear is positioned so as to maintain constant platform speed as well as respond to changes in wind direction, said polarized relay also being adapted to initiate a reverse electrical signal delayed for producing stable operation.

10. A wind turbine in accordance with claim 3, including a dish like cap mounted at the top and bottom of the platform for stabilizing and funneling a greater quantity of wind across the platform.

* * * * *